US007887032B2

(12) United States Patent
Malone

(10) Patent No.: US 7,887,032 B2

(45) Date of Patent: Feb. 15, 2011

(54) SELF-CENTERING CONTROL ROD

(75) Inventor: Curtis W Malone, Mustang, OK (US)

(73) Assignee: Fallbrook Technologies Inc., San Diego, CA (US)

( * ) Notice: Subject to any disclaimer, the term of this patent is extended or adjusted under 35 U.S.C. 154(b) by 118 days.

(21) Appl. No.: 12/266,297

(22) Filed: Nov. 6, 2008

(65) Prior Publication Data

US 2009/0114058 A1 May 7, 2009

Related U.S. Application Data

(60) Provisional application No. 60/986,159, filed on Nov. 7, 2007.

(51) Int. Cl.
*F16F 9/00* (2006.01)

(52) U.S. Cl. .......................................... 267/70; 74/592

(58) Field of Classification Search ............. 267/66–74; 74/592

See application file for complete search history.

(56) References Cited

U.S. PATENT DOCUMENTS

| | | | | |
|---|---|---|---|---|
| 2,563,370 A * | 8/1951 | Reese | ......................... | 267/290 |
| 3,207,248 A * | 9/1965 | Strom | ....................... | 180/14.5 |
| 4,456,233 A * | 6/1984 | Muller | ........................ | 267/70 |

* cited by examiner

*Primary Examiner*—Christopher P Schwartz
(74) *Attorney, Agent, or Firm*—Knobbe, Martens, Olson & Bear LLP

(57) ABSTRACT

Embodiments include a self-centering control rod device having two independently operating springs, a bushing, and a control rod. The two springs utilize preload compression to maintain the control rod centered. One spring operates directly against the control rod while the other operates against the bushing. Each spring may have different spring strength or established preload in order to balance out the application force required to control a particular object. Spring compression force adjustments on one spring do not affect the center point or the spring compression force adjustment of the other spring.

17 Claims, 3 Drawing Sheets

SELF-CENTERING CONTROL ROD

CROSS-REFERENCE TO RELATED APPLICATIONS

This application claims the benefit of U.S. Provisional Patent Application No. 60/986,159, filed on Nov. 7, 2007, which is hereby incorporated by reference in its entirety.

BACKGROUND OF THE INVENTION

1. Field of the Invention

The present invention relates to a self-centering control rod linkage that is free to move linearly yet automatically returns to center when the actuating force is removed.

2. Description of Related Art

Certain industrial processes require a control rod mechanism that will move freely in a linear direction (i.e., "side-to-side" or "back-and-forth") yet return to center when the operator removes the actuating force. For example, a typical hydraulic sliding spool valve may be connected to a self-centering linkage. The spool valve may have a center position with ports configured such that movement of the spool in one direction from center opens a certain combination of ports. Likewise, movement of the spool in the opposite direction from center opens a different combination of ports. At rest the spool is intended to remain in a neutral center position.

Such a spool valve may feature a handle attached to the end of a control rod linkage that is attached to an end of the spool. Prior art self-centering control rod linkages (such as that depicted in FIG. 1) typically utilize a control rod that passes through an opening in some type of support bracket. Springs on either side of the bracket are then attached to the control rod by either a fixed or adjustable collar. The collar traps the spring between the face of the collar and the bracket. With a spring and collar on both sides of the center bracket, the spring preload force positions the rod such that the compressed spring forces on either side of the bracket are balanced and the rod is in a neutral position (equilibrium).

A self-centering control rod linkage is also used in some applications involving certain vehicle transmissions. For example, a continuously variable transmission such as that disclosed in U.S. Pat. No. 6,419,608 (titled "Continuously Variable Transmission" and owned by Fallbrook Technologies) uses a self-centering control rod to shift the transmission between its ranges (forward-neutral-reverse). With the control rod in the center position, the transmission is in neutral. If the control rod is moved one direction from center, power is transferred through the transmission such that it propels the vehicle forward. Movement of the control rod in the opposite direction from center places the transmission in reverse. Accordingly, a need exists for improved self-centering control-rods.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention can provide advantages including those described herein.

One embodiment utilizes a control rod that is partially encircled by a bushing. The bushing is supported by two independent support brackets (one to the left and one to the right). Both the bushing and the control rod are free to move linearly, relative to one another, and both relative to the brackets. Two independent springs, one on either side of one of the brackets, provide the force necessary to retain the control rod in the center position. One end of the control rod is typically attached to a device to be controlled while the other end is attached to an actuator, such as a handgrip or lever. The springs are retained such that an operator applying force to the actuator will cause the control rod to move relative to the brackets. As the control rod is moved to the left (axially), the rightmost spring is compressed and the leftmost spring is unaffected. Conversely, as the control rod is moved to the right the leftmost spring is compressed and the rightmost spring is unaffected. Because only one spring is ever affected upon moving the control rod in a given direction, each spring can utilize different spring pressures. This allows the embodiment to be tuned such that the operator feels a balanced force at the actuator even if the device under control has differing activation/deactivation force requirements.

The springs can be adjusted independently without upsetting the center point balance. The rightmost spring contacts the control rod at one end and contacts a preload device on the rightmost end of the bushing, and thus acts to apply force between the control rod and the bushing. The leftmost spring contacts one support bracket and maintains pressure on another preload device attached to the bushing. The spring pressure from the rightmost spring forces the bushing interference device against a stop on the leftmost support bracket. Thus, with no external force applied to the control rod, the system is in this equilibrium state. Adjustments to the center position can be made by moving the stop attached to the leftmost support bracket.

BRIEF DESCRIPTION OF THE DRAWINGS

The present invention will be more fully understood by reference to the following detailed description of the preferred embodiments of the present invention when read in conjunction with the accompanying drawings, wherein.

DETAILED DESCRIPTION OF CERTAIN EMBODIMENTS

Figure 1:
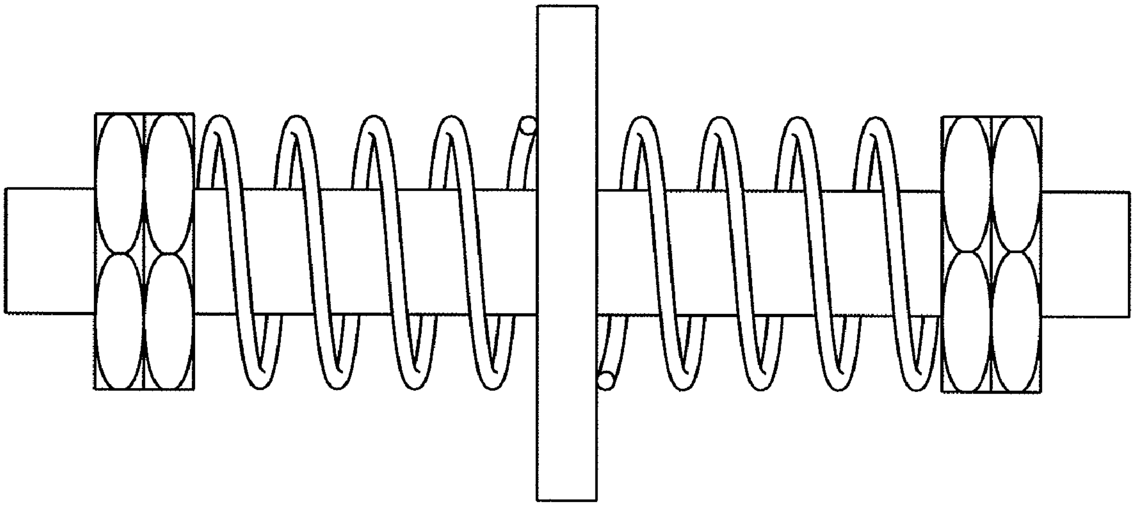
FIG. 1 (Prior Art)
FIG. 1 depicts a prior art self-centering control rod.

The above figures are provided for the purpose of illustration and description only, and are not intended to define the limits of the disclosed invention. Use of the same reference number in multiple figures is intended to designate the same or similar parts. Furthermore, when the terms "top," "bottom," "right," "left," "rightward," "leftward," "first," "second," "upper," "lower" "height" "width" "length" "end" "side" "horizontal" "vertical" and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

Current self-centering control rod devices face numerous problems. One problem is that the balance of forces on both sides of the return mechanism is highly temperamental. This creates a system that is difficult to establish and maintain balanced in an equilibrium state. If the application requires any precision as to the exact center point, virtually no drift is allowed. However, aging and other environmental factors (such as heat) cause spring tensions to change and the center point to shift. Current self-centering devices must be continually calibrated to compensate for these changes or the device may continually drift.

Another problem with current self-centering control rod devices is the force balance required to operate the device. Such a device must have equilibrium of force between the opposing centering springs to remain centered. However, the valve or transmission to which the self-centering device is attached may require a greater force to move in one direction as opposed to the other. For example, a spool valve may be moving against a greater fluid pressure when moved to the right yet have very little pressure when moving the spool to the left. With current self-centering devices, this differing application force will be felt by the operator.

Yet another problem with current self-centering control rod devices is the oscillations that can occur about the center point. Current self-centering mechanisms featuring opposing compressed springs that maintain opposing pressure on the centering bracket. However, springs are notorious for oscillations. These spring oscillations pass from side to side resulting in a mechanism whose center point drifts from side to side at the frequency of oscillation.

Figure 2:
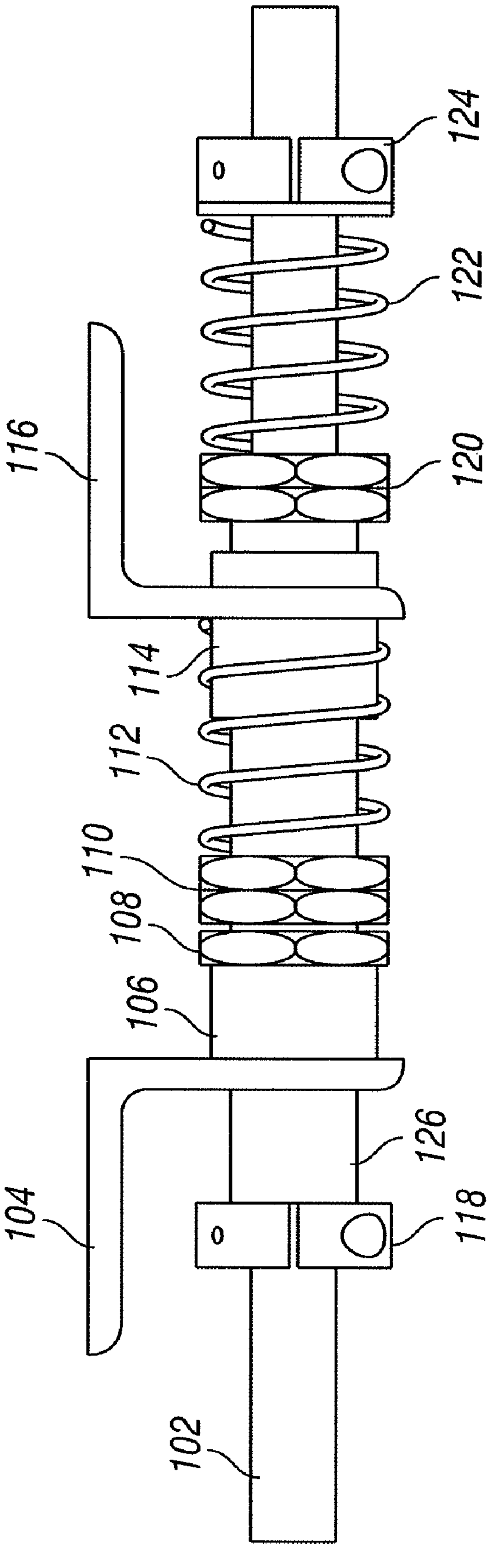
FIG. 2 depicts a frontal view of a preferred embodiment of the present invention.

Accordingly, a need exists for a self-centering control rod mechanism that is simple to calibrate, maintains calibration under environmental and operational extremes, and minimizes oscillations about the center point. Further, a need exists for a self-centering control rod mechanism that balances the application force felt by the operator regardless of differing forces required by the device under control. Embodiments disclosed herein address these needs and others as shown herein FIG. 2 depicts a preferred embodiment of the present invention. This embodiment features a control rod (102) encircled by a bushing (126). The control rod (102) and bushing (126) are free to move linearly relative to one another. The bushing (126) passes through openings in a leftmost support bracket (104) and a rightmost support bracket (116). The bushing (126) is also free to move linearly relative to the support brackets (104 and 116).

In this embodiment, the leftmost support bracket (104) features a support area (106) with a leftward travel stop (108). This travel stop (108) serves to maintain the position of the bushing (126) when at rest (equilibrium). A leftmost coil spring (112) encircles the bushing (126) and abuts the left side of the rightmost support bracket (116). A support area (114) on this bracket serves to maintain position on the spring (112) to keep it from contacting the bushing (126). Threads near the center of the bushing (126) allow for positioning of locknuts (110) to establish desired leftmost spring (112) preload pressure. The amount of preload on this spring (112) determines the amount of return force applied to the control rod (102) via the bushing (126) when the control rod (102) returns to the left upon removal of externally applied actuating forces.

The present embodiment also features a rightmost spring (122) that encircles the control rod (102) to the right of the rightmost support bracket (116). In this embodiment, the end of the spring (122) farthest from the bracket (116) is held in place on the control rod (102) by an adjustable collar (124). This adjustable collar (124) serves as an attaching means for attaching the spring (122) to the control rod (102).

The side of the spring opposite the attaching means abuts a locknut (120) placed on the rightmost end of the bushing (126). As before, this locknut (120) serves to establish the amount of preload on the rightmost spring (122). The amount of preload on this spring (122) determines the amount of return force applied to the control rod when the control rod (102) returns to the right upon removal of externally applied actuating forces. A second adjustable collar serves as a rightward travel stop (118) to limit the rightward motion of the control rod (102) at rest (equilibrium).

Figure 3:
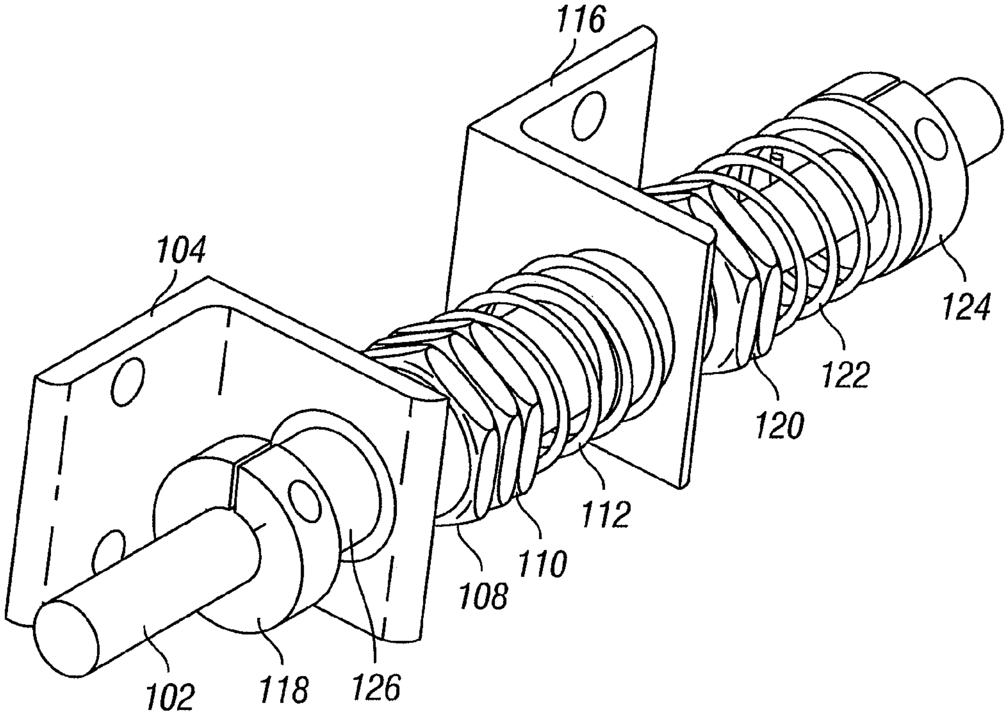
FIG. 3 depicts an isometric view of the same embodiment.
Figure 4:
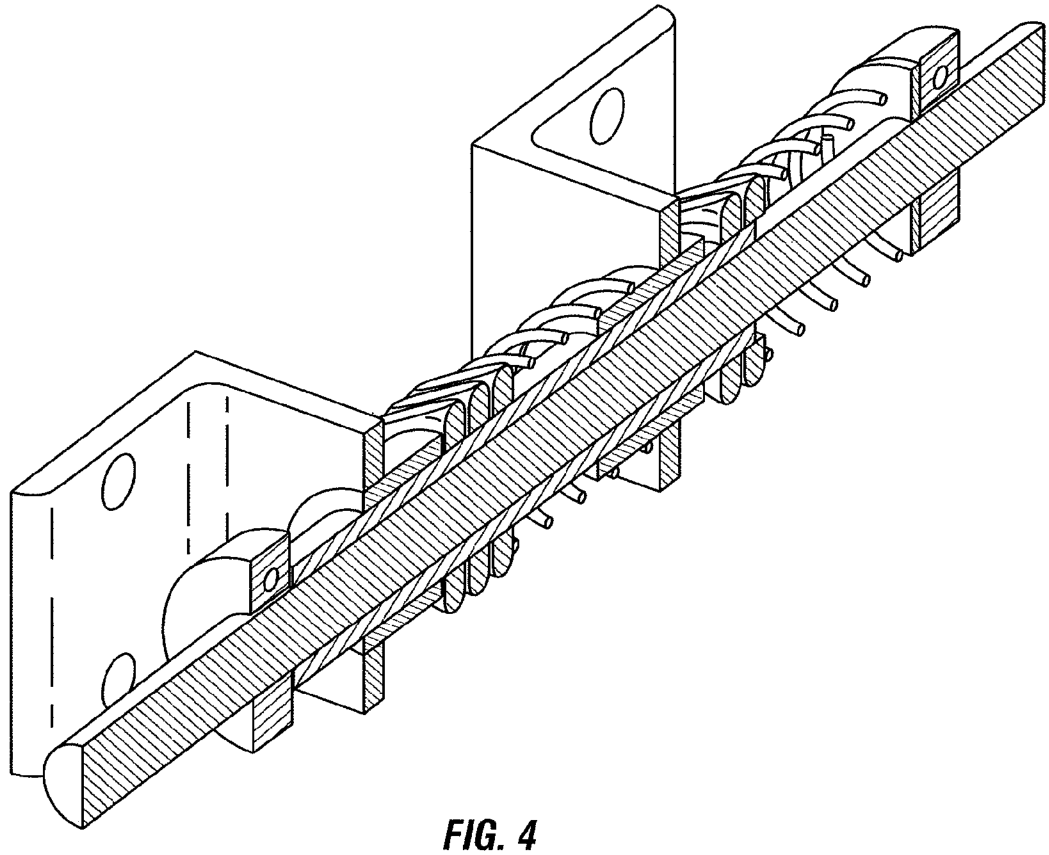
FIG. 4 depicts a cutaway isometric view of the embodiment to improve the differentiation between the various component parts.

FIG. 3 and FIG. 4 depict an isometric view of the claimed apparatus to allow improved differentiation between the various component parts. The cutaway view in FIG. 4 shows how the control rod (102) passes entirely through the central portion of the bushing (126). Further, the view shows the extent to which the bushing (126) passes through the support brackets (104 and 116).

As stated previously, the present embodiment provides distinct, positive stops for each direction of travel (leftward and rightward travel stops, 108 and 118, respectively). Consequently, the apparatus is not susceptible to oscillations about the equilibrium point as are the prior art self-centering devices. The prior art self-centering devices utilize balanced spring pressures on either side of a center bracket to maintain equilibrium. Thus, the natural harmonic oscillations generated in a spring are transferred from one side to the other. In the present invention, the positive stops (118 and 108) drastically reduce or prevent such transfer.

In another embodiment, the two brackets (104 and 116) are combined into a single bracket. This single bracket, however, features two distinct support areas (such as 106 and 114 in FIG. 2). Thus, a single bracket may be fashioned to provide support for the claimed apparatus. Sufficient distance is required between the support areas to allow for movement of the leftmost spring preload device (110).

Leftward Displacement of the Control Rod

When the control rod (102) is forced to the left, the leftward travel stop (108) contacts the stationary support area (106). This prevents the bushing (126) from moving to the left. This also has the effect of maintaining the rightmost preload device (120) stationary. The preload from the rightmost spring (122) bears against the rightmost preload device (120) which keeps the leftward travel stop (108) seated against the support area (106), because the relative spacing between the rightmost preload device (120) and the leftward travel stop (108) is fixed during device setup. Thus, when the control rod (102) is forced to the left, the adjustable collar (124) will compress the rightmost spring (122) in proportion to the leftward displacement of the control rod (102). Because the rightmost bracket (116) remains stationary as does the leftmost preload device (110) during leftward displacement of the control rod (102), the leftmost spring (112) remains constant and unaffected in its preload state. When the external actuating force is removed from the control rod (102), the increased spring pressure in the rightmost spring (122) forces the control rod (102) back until the rightward travel stop (118) contacts the bushing (126). The apparatus is then in its equilibrium state (center point).

Rightward Displacement of the Control Rod

When the control rod (102) is forced to the right, the bushing (126) is consequently forced to the right due to contact with the rightward travel stop (118). Because the rightmost support bracket (116) is stationary, rightward movement of the bushing (126) results in compression of the leftmost spring (112) in proportion to the rightward displacement of the control rod (102). Because the rightmost preload device (120) moves with the bushing (126), the rightmost spring (122) remains constant and unaffected in its preload state. When the external actuating force is removed from the control rod (102), the increased spring pressure in the leftmost spring (112) forces the bushing (126) back to the left until the leftward travel stop (108) contacts the stationary support area (106). Since the bushing (126) is always in contact with the rightward travel stop (118) which is in turn fixed to the control rod (102), the control rod (102) is forced to move leftward in synchronous travel with the bushing (126).

Construction of the Apparatus

The present embodiment allows for use of materials suitable for any particular application. For example, the control rod (102) must be manufactured from a material or materials with qualities that can withstand the types of forces that it will encounter. In the present embodiment, the control rod (102) is made of metal. The use of metal affords durability, strength, rigidity, and machineability over softer materials, and allows the control rod (102) to withstand compressive and tensile stresses experienced in operation. However, other materials, such as plastic or plastic composites may be used so long as the rod is capable of withstanding the environmental extremes in which it operates. Any suitable material may be utilized without exceeding the scope of the present invention.

The shape of the control rod (126) in the present embodiment is cylindrical. However, other cross-sectional shapes (such as a triangular, square, rectangular, or oval) may be utilized depending on the application requirements. For example, a particular cross-section shape may provide additional rigidity in a particular application and may be preferable over a standard circular cross section. Any suitable shape may be utilized without exceeding the scope of the present invention.

Likewise, the bushing (126) is made of metal to withstand, primarily, the compressive stresses it encounters in operation. The material chosen should be sufficiently durable, rigid, and machineable to prevent undue deflection or distortion of the bushing (126). This is important because the control rod (102) must be free to move within the bushing (126), relative to the bushing (126). In addition, the bushing (126) must be free to move within the brackets (104 and 116), relative to the brackets (104 and 116). Any such suitable material may be utilized without exceeding the scope of the present invention.

The shape of the bushing (126) in the present embodiment is cylindrical. However, other cross-sectional shapes (i.e., triangular, square, rectangular, oval, etc.) maybe utilized depending on the application requirements. For example, a particular cross-section shape may provide additional rigidity in a particular application and may be preferable over a standard circular cross section. Any suitable shape may be utilized without exceeding the scope of the present invention. If a different shape is utilized, the openings in the brackets (104 and 116) through which the bushing (126) must pass must correspond. Likewise, the central opening in the bushing (126) through which the control rod (102) must pass must also correspond with the control rod (102) cross-sectional shape.

The brackets (104 and 116) in the present embodiment are metal and are designed to provide adequate support to the overall device. The brackets (104 and 116) are also sufficiently rigid to allow the springs to operate without undue deflection. The shape and materials of the brackets (104 and 116) are immaterial and any shape or material chosen is within the scope of the present invention.

To improve the operation of the present invention, certain coatings or lubricants may be utilized on the material surfaces. For example, the bushing (126) may utilize soft-metal or polymer coatings on its inner and/or exterior friction surfaces. Further, such friction reducing materials may be utilized on the control rod (102) and/or bracket (104 and 116) friction surfaces as well. Use of friction reducing materials is within the scope of the present invention.

The present embodiment features the use of an adjustable collar (124) as an attaching means for attaching the spring (122) to the control rod (102). It will be appreciated that other attaching means, such as clamps, threaded nut, welded washers, a machined feature, or the like, may be employed without departing from the scope of the present invention. For example, another embodiment of the present invention may feature a washer-type shape welded to the control rod, against which the spring force is applied. The present invention merely dictates that an attaching means be supplied that is sufficient to maintain contact between the spring and the rod. The scope of the present invention is intended to encompass all equivalent structures.

While the present embodiment utilizes an adjustable collar for the rightward travel stop (118), other means, such as a clamp, threaded nut, welded washer, machined feature, or the like, may be used without departing from the scope of the present invention. The means chosen for the travel stop (118) must be suitable to maintain contact between the control rod (102) and the bushing (126), without slippage of the stop (118) due to impact by the bushing (126). The scope of the present invention is intended to encompass all equivalent structures.

This embodiment uses a nut for a leftward travel stop (108). However, other means, such as a clamp, welded washer, machined feature, or the like, may be utilized for the stop (108) and are within the scope of the present invention. For example, the support area (106) on the leftmost bracket (104) may have a machined flange that serves as the leftward travel stop.

Two different locknuts (110 and 120) are featured in the present embodiment. These locknuts (110 and 120) are attached to the bushing (126) in two distinct locations. These adjustable locknuts serve as spring preload devices. While the present embodiment utilizes adjustable nuts (110 and 120) for the preload devices, other means may be utilized and are within the scope of the present invention. For example, the rightmost end of the bushing (126) may feature a raised machined flange against which the rightmost spring (122) may abut. Likewise, the leftmost nut (110) could be replaced with a similar welded or machined flange against which the rightmost spring (112) abuts and against which the leftward travel stop (108) would impact.

One important aspect of the invention is the precision which can be obtained in centering the control rod (102). This is primarily due to the fact that the left and right springs (112 and 122) may be independently adjusted to establish preload. The positive stops (118 and 108) dictate the control rod (102) center point independent of the spring preload. Left spring (112) preload ensures the leftward travel stop (108) remains seated against the stationary support area (106). Right spring (122) preload ensures the rightward travel stop (118) remains seated against the bushing (126), which is stationary because the leftward travel stop (108) is seated against the stationary support area (106). A change in preload on either the right or left springs will only serve to vary the external force required to actuate the control rod (102) in the rightward or leftward direction.

To adjust the control rod (102) center point, loosen the right spring attaching means (124) to remove the right spring (122) preload pressure. If the attaching means (124) is not adjustable, the rightmost preload device (120) can be adjusted instead. Next, loosen the rightward travel stop (118). While maintaining the leftmost travel stop (108) seated against the stationary support area (106) and the rightmost travel stop (118) seated against the bushing (126), position the control rod (102) as necessary. Next, tighten the rightward travel stop (118) while maintaining contact with the bushing (126). Restore right spring (122) preload by repositioning the attaching means (124) and reestablishing proper preload by adjusting the rightmost preload device (120).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

What is claimed is:

1. A self-centering control rod apparatus for maintaining a control rod in an equilibrium position when no external operating forces are applied, the apparatus comprising:

a first and second support bracket, each with a collinear opening;

a bushing supported by the first and second support bracket openings such that the bushing passes through both support bracket openings and linearly translates relative to the support brackets, the bushing comprising:

an axial centrally located opening through which the control rod linearly translates relative to the bushing; and a first and second spring preload device, each preload device positively retained by the bushing, wherein the first spring preload device is located on one end of the bushing outside of the space between the brackets while the second spring preload device is located near the center of the bushing in the space between the brackets;

a first spring attached to the control rod by an attaching means on the end outside of the first bracket, wherein the spring end opposite the attaching means abuts the first spring preload device, and wherein the spring is partially compressed between the attaching means and the first spring preload device;

a second spring, wherein one end of the second spring abuts the first bracket on the inside of the first bracket and the other end of the second spring abuts the second preload device, and wherein the second spring is partially compressed between the first bracket and the second spring preload device; and a travel stop device retained by the control rod such that the travel stop device maintains contact with the bushing, at the bushing end opposite that of the first spring preload device and outside the first support bracket, when no external operator forces are applied.

2. The device of claim 1, wherein at least on of the first and second spring preload devices is adjustable.

3. The device of claim 1, wherein at least on of the first and second spring preload devices is fixed.

4. The device of claim 1, wherein the attaching means is adjustable.

5. The device of claim 1, wherein the attaching means is fixed.

6. The device of claim 1, wherein the travel stop is adjustable.

7. The device of claim 1, wherein the travel stop is fixed.

8. A self-centering control rod apparatus for maintaining a control rod in an equilibrium position when no external operating forces are applied, the apparatus comprising:

a support bracket, wherein the support bracket has a first and second support area, each support area separated by a distance and having an opening with both openings collinear;

a bushing supported by the first and second support area openings such that the bushing passes through both openings and linearly translates relative to the support bracket, the bushing comprising:

an axial centrally located opening through which the control rod linearly translates relative to the bushing; and a first and second spring preload device, each preload device positively retained by the bushing, wherein the first spring preload device is locate on one end of the bushing outside of the space between the first and second support areas while the second preload device is located near the center of the bushing in the space between the first and second support areas;

a first spring attached to the control rod by an attaching means on the end outside of the bracket, wherein the spring end opposite the attaching means abuts the first spring preload device, and wherein the spring is partially compressed between the attaching means and the first spring preload device;

a second spring, wherein one end of the second spring abuts the bracket on the first support area in the space between the first and second support areas and the other end of the second spring abuts the second spring preload device, and wherein the second spring is partially compressed between the bracket and the second spring preload device; and a travel stop device retained by the control rod such that the travel stop device maintains contact with the bushing, at the bushing end opposite that of the first spring preload device and outside the support bracket, when no external operator forces are applied.

9. The device of claim 8, wherein at least one of the first and second spring preload devices is adjustable.

10. The device of claim 8, wherein at least one of the first and second spring preload devices is fixed.

11. The device of claim 8, wherein the attaching means is adjustable.

12. The device of claim 8, wherein the attaching means is fixed.

13. The device of claim 8, wherein the travel stop is adjustable.

14. The device of claim 8, wherein the travel stop is fixed.

15. A method of maintaining a control rod in an equilibrium position, the method comprising the steps of:

operably coupling at least one support bracket to a bushing;

operably coupling a first spring to the bushing;

operably coupling a second spring to the bushing;

establishing a first spring preload on the first spring relative to the support bracket; and establishing a second spring preload on the second spring, wherein the first spring preload is separate from the second spring preload.

16. The method of claim 15, wherein establishing a first spring preload comprises providing at least one adjustable spring preload member.

17. The method of claim 15, wherein establishing a first spring preload comprises providing a fixed spring preload member.

* * * * *